Mar. 6, 1923.
W. H. FULLINGTON
1,447,538
TENSION DEVICE FOR ROPE MAKING MACHINES
Filed Oct. 5, 1922 2 sheets-sheet 1
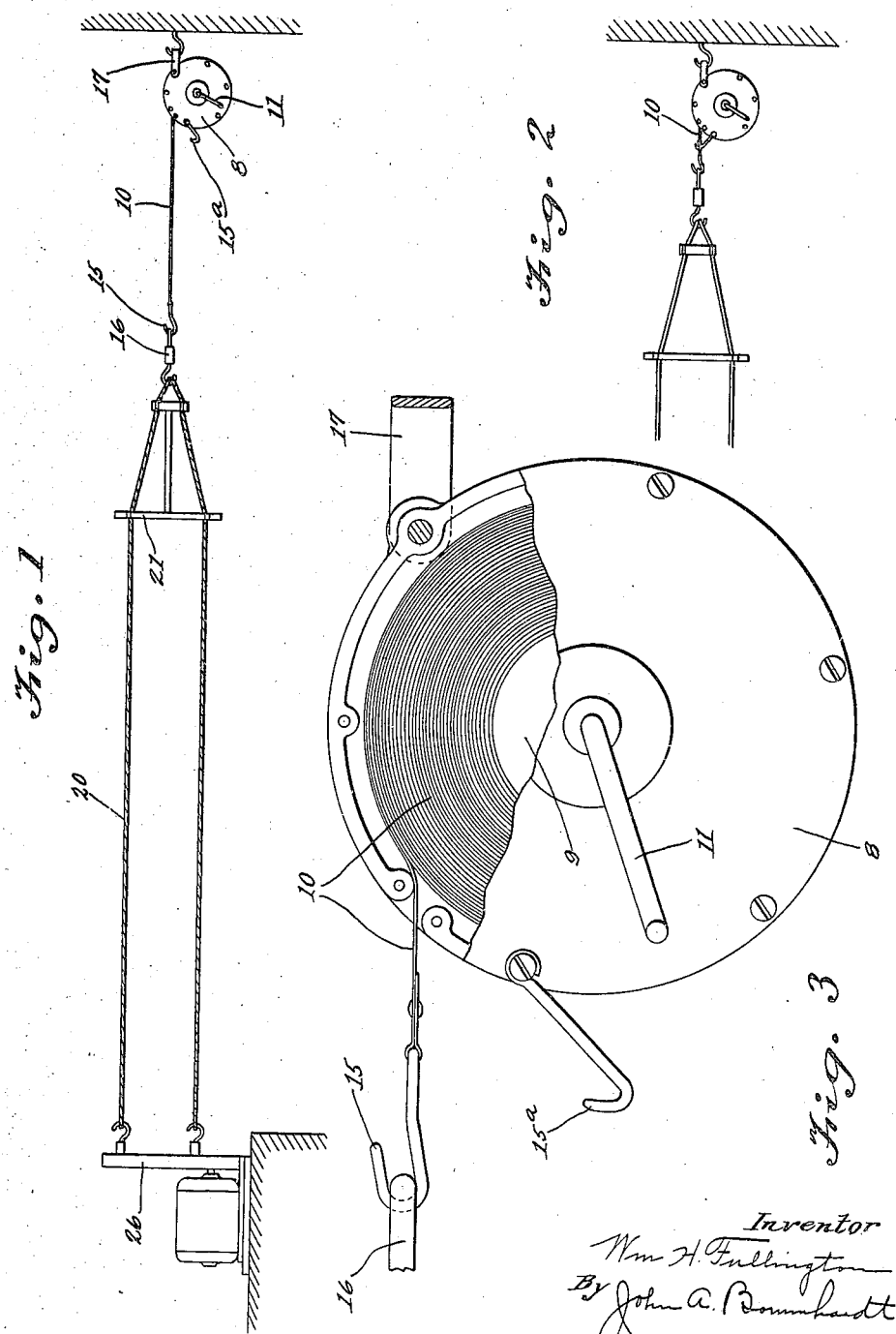
Inventor
Wm H. Fullington
By John A. Bornhardt
Att'y Mar. 6, 1923.
W. H. FULLINGTON
1,447,538
TENSION DEVICE FOR ROPE MAKING MACHINES
Filed Oct. 5, 1922　　2 sheets-sheet 2
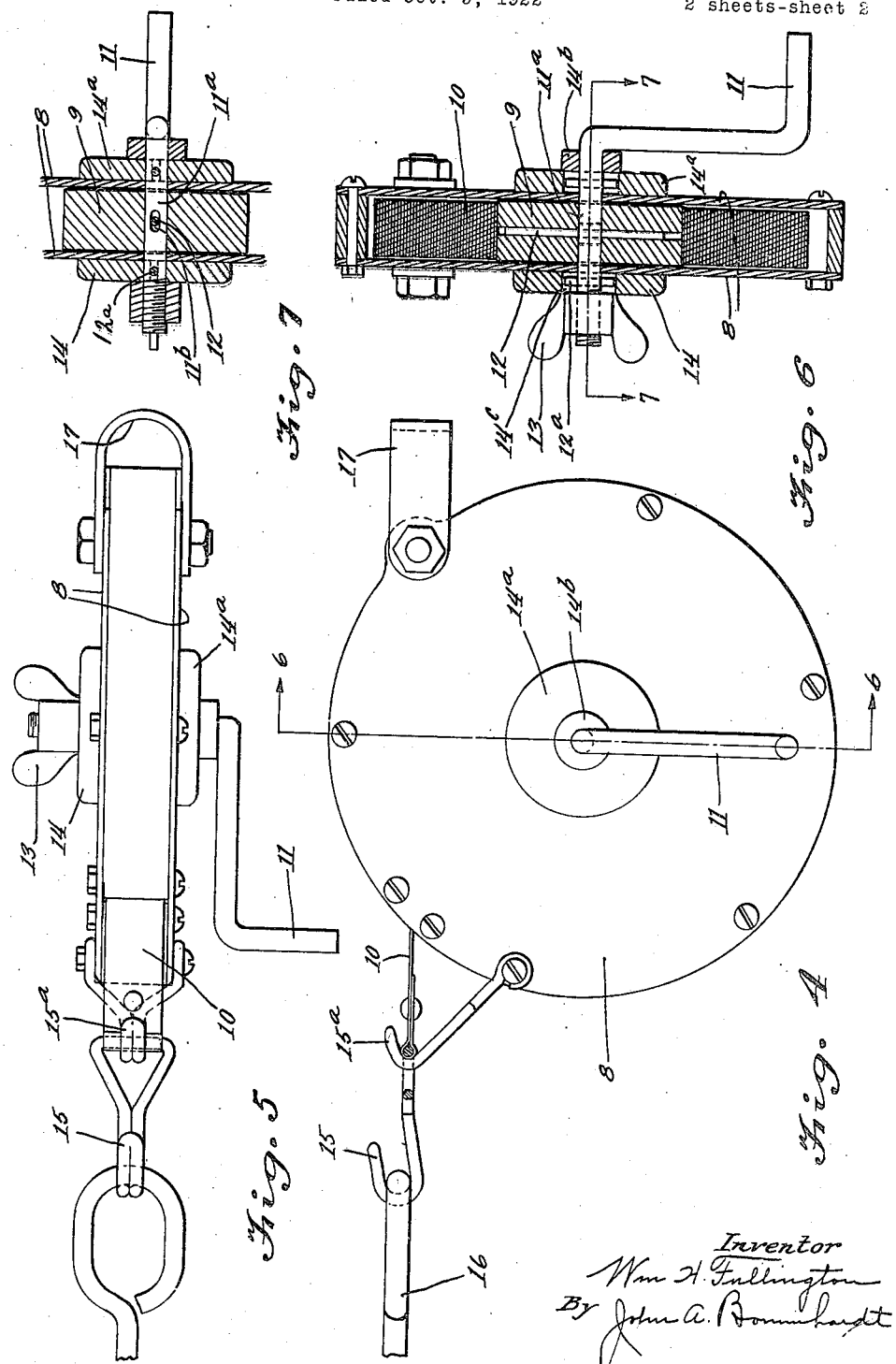

Patented Mar. 6, 1923.

1,447,538

UNITED STATES PATENT OFFICE.

WILLIAM H. FULLINGTON, OF CLEVELAND, OHIO.

TENSION DEVICE FOR ROPE-MAKING MACHINES.

Application filed October 5, 1922. Serial No. 592,469.

*To all whom it may concern:*

Be it known that I, WILLIAM H. FULLINGTON, a citizen of the United States, residing at Cleveland, in the county of Cuyahoga and State of Ohio, have invented certain new and useful Improvements in Tension Devices for Rope-Making Machines, of which the following is a specification.

This invention relates to rope making devices. In this art it is customary to wind the several strands into a rope by means of a rotary driving mechanism which is connected to the ends of the strands, the latter passing then through a spreader which holds the strands apart at one end and at the other end directs them to a central point in the axis of the spreader where the winding is effected, the ends of the rope being connected to a swivel hook which is connected by a cable to a weight or the like to preserve proper tension on the rope as the winding proceeds.

The object of the invention is to produce an improved device which may be substituted for the weight. It will be appreciated that the vertical travel of a weight is somewhat limited, and consequently the rope produced is correspondingly limited. By means of the present device a much longer stretch of rope can be twisted at each operation, a coiled tape being substituted for the weight, and this coiled tape is controlled by a tension device which acts on the drum on which the tape is wound.

One form of the invention is illustrated in the accompanying drawings in which Fig. 1 is a side elevation showing the device applied. Fig. 2 is a similar view showing the use of a second hook as will be described hereinafter. Fig. 3 is a side elevation of the tension device, enlarged, with a part broken away. Fig. 4 is a view similar to Fig. 3, but with a second hook engaged. Fig. 5 is a top plan view of the tension device. Fig. 6 is a section on the line 6—6 of Fig. 4, and Fig. 7 is a section on the line 7—7 of Fig. 6.

In the drawings the strands of the rope being made are indicated at 20 connected at one end to a driving mechanism 26 for revolving the strands and extending at the other end through a spreader 21 and connected to a swivel hook 16, in a manner similar to that disclosed in my application No. 494,271, filed August 22, 1921.

The tension device, to which the present invention relates, comprises a pair of side plates 8 forming a casing within which is a drum 9 on which the metal tape 10 is wound, this tape being adapted for connection to the swivel hook 16 above referred to. A crank handle 11 is integral with a shaft $11^a$ which is keyed to the drum 9. A pin 12 holds the tape on the winding core, and this pin extends through a slot $11^b$ in the shaft $11^a$, as shown in Figs. 6 and 7. The shaft $11^a$ is threaded at the end opposite the crank 11 to receive a wing nut 13, and there are two friction collars 14 and $14^a$ pinned on the shaft by pins $12^a$, and pressing against the outer surfaces of the plates 8. One of these collars backs against a nut $14^b$ on the shaft and the other is confined by the wing nut 13. When the nut is tightened the friction collars press against the plates and thereby cause tension tending to prevent unwinding of the tape, the collars being recessed as indicated at $14^c$ to permit the necessary movement with respect to the shaft $11^a$, and the slots $11^b$ permitting the casing and drum to shift laterally on the shaft to the extent necessary.

The end of the tape has a hook 15 which may be engaged with the swivel hook 16, and the casing is provided with a pivoted hook $15^a$ which may be engaged with the loop of the hook 15, as shown in Fig. 4, and when so engaged will prevent the tape from unwinding.

In setting up the apparatus for use the hook $15^a$ is engaged as shown in Fig. 4, and the strands 20 are connected up ready for rotation, and by means of the crank the tape is adjusted to the desired tension. The hook $15^a$ is then released and the rope winding proceeds. As it proceeds the tape will slip to the requisite extent, at the same time maintaining the desired tension on the rope and eliminating the necessity for any weight as above referred to.

The tape 10 may be made of any suitable material, such as metal or fibre, and the casing is connected to a post or fixed object by means of a clevis 17.

I claim:

1. A tension device for rope making machines comprising a casing, a drum therein, a tape wound on the drum, means to produce tension on the tape, and means carried by the casing to engage the tape and prevent unrolling thereof, the last mentioned means consisting of a hook pivoted to the casing and engageable with the tape to hold the same.

2. A tension device for rope making machines comprising a pair of side plates, a shaft extending through the same, a drum on the shaft between the plates, a tape wound on the drum, friction collars on the shaft and pressing against the side of the plates, and means carried by the shaft to vary the pressure of said collars, said means consisting of a nut screwed on the end of the shaft, against one of the collars.

In testimony whereof, I affix my signature in presence of two witnesses.

WILLIAM H. FULLINGTON.

Witnesses:
 JOHN A. BOMMHARDT,
 BESSIE F. POLLACK.